United States Patent Office 3,576,864
Patented Apr. 27, 1971

3,576,864
(TRIFLUOROMETHYL-PHENYL)
SEMICARBAZINES
Kuppuswamy Nagarajan, Bombay, India, assignor to Ciba Limited, Basel, Switzerland
No Drawing. Filed July 31, 1967, Ser. No. 657,030
Claims priority, application Switzerland, Aug. 11, 1966, 11,587/66; Sept. 20, 1966, 13,570/66; June 23, 1967, 8,951/67
Int. Cl. C07c 133/02
U.S. Cl. 260—554       11 Claims

ABSTRACT OF THE DISCLOSURE

Semicarbazides of the formula

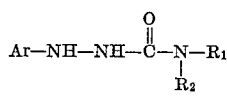

in which Ar represents a phenyl group substituted by at least one trifluoromethyl group, and $R_1$ and $R_2$ each represents hydrogen or an organic radical or, when taken together, a bivalent organic radical, or salts thereof, having utility as anticonvulsants.

SUMMARY OF THE INVENTION

The present invention concerns new semicarbazide compounds of the formula

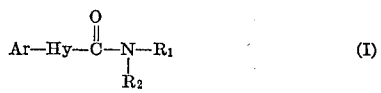 (I)

in which Ar represents a phenyl group containing at least one trifluoromethyl group, Hy represents a hydrazo group, and $R_1$ and $R_2$ each represents a hydrogen atom or an organic residue, or, when taken together, a bivalent organic residue, and salts thereof, as well as pharmaceutical preparations containing them and process for their preparation. The novel compounds and compositions containing them are useful as anticonvulsants in the treatment of grandmal epilepsy, psycchomotor seizures, petitmal epilepsy and other types of seizures.

DESCRIPTION OF THE PREFERRED EMBODIMENTS

Apart from the trifluoromethyl group, the phenyl radical may contain one, two or more additional substituents, such as trifluoromethyl groups, halo, such as fluorine, chlorine or bromine, lower alkyl, such as methyl, ethyl- n-propyl, isopropyl or n-butyl groups, etherified hydroxyl, for example, lower alkoxy groups, such as methoxy, ethoxy, n-propyloxy, isopropyloxy or n-butyloxy groups, etherified mercapto, for example, lower alkylmercapto groups, such as methylmercapto or ethylmercapto groups, carboxyl or esterified carboxyl groups, such as carbo- lower alkoxy, for example, carbomethyl or carboethoxy groups, or other suitable residues.

The hydrazo group Hy is preferably unsubstituted, though it may, if desired, contain one, two or more organic, such as aliphatic, residues, especially lower alkyl groups, such as those mentioned above.

An organic residue representing $R_1$ and/or $R_2$ may be a hydrocarbon residue, such as an aliphatic, as well as a cycloaliphatic hydrocarbon residue, especially a lower aliphatic as well as a lower cycloaliphatic hydrocarbon residue having preferably 3 to 8 ring members, such as an alkyl, especially lower alkyl group, for example, one of those mentioned above, or an alkenyl, especially lower alkenyl, for example, an allyl or methallyl group, or an alkinyl, especially lower alkinyl, for exampe, a propargyl group, or a cycoalkyl, cycloalkenyl, cycloalkyl-lower alkyl or cycloalkenyl-lower alkyl group having preferably 5-7 ring members, e.g. cyclopentyl, cyclohexyl, cyclopentenyl or cyclohexenyl, cyclopentyl-, cyclohexyl- or cy- clohexenylmethyl or -ethyl group. An organic residue $R_1$ and/or $R_2$ may also be an aromatic hydrocarbon group, such as a phenyl group, or an araliphatic hydrocarbon group, such as a phenylalkyl, especially a phenyl-lower alkyl residue, for example, a benzyl or a phenylethyl, or a heterocyclic or heterocyclyl-aliphatic residue, in which the heterocyclic group may be of aromatic character, such as a pyridyl, for example, 2-, 3- or 4-pyridyl residue, a thienyl, for example, 2-thienyl residue, or a furyl, for example, a 2-furyl residue. The above hydrocarbon or heterocyclic residues may also be substituted; substituted aryl groups, including heterocyclic residues or aromatic character, as well as aliphatic residues, especially alkyl groups, may contain one, two or more identical or different substitutents, such as lower alkyl, hydroxy, lower alkoxy or trifluoromethyl groups, and/or halo or phenyl groups, which may contain the aforementioned groups as additional substituents.

A bivalent organic radical, representing $R_1+R_2$ is primarily a bivalent aliphatic, especially a bivalent lower aliphatic hydrocarbon radical, in which the chain carbon atoms may optionally be interrupted by hetero atoms, such as oxygen, sulfur or optionally substituted, such as N-lower alkylated nitrogen atoms. Such radicals are, for example, lower alkylene radicals with 2-7 preferably, with 4-7 carbon atoms, e.g. 1,4-butylene, 1,5-pentylene, 1,6-hexylene or 3-methyl-1,5-pentylene, lower alkenylene radicals, preferably with 4-7 carbon atoms, e.g. 1,5-pent- 2-enylene, lower oxa or thia-alkylene radicals with preferably 4 carbon atoms, e.g. 3-oxa- or 3-thia-1,5-pentylene, or lower aza-alkylene radicals with preferably 4-6 carbon atoms, e.g. 3-methyl-3-aza-1,5-pentylene.

In this specification, unless otherwise specified, the term "lower," whenever used in conjunction with an organic radical or compound, denotes such radical or compound as preferably containing up to 7 carbon atoms.

The new compounds possess valuable pharmacological properties. They have anticonvulsive properties of long duration as can be shown, for example, by the oral administration to test animals, such as mice, as determined by the maximal electroshock test. In addition, they possess significant activity in the so-called "psychomotor" electric shock test of Toman. [Toman, Neurology, vol. 1, p. 444 (1951); Toman and Taylor, Epilepsia, vol. 1, p. 31 (1952)]. These compounds are, therefore, useful as anti- convulsants in the treatment of grandmal epilepsy, psycho- motor seizures, petitmal epilepsy and other types of seizures.

Furthermore, the new compounds are also useful as intermediate products for the manufacture of other, especially pharmacologically active, compounds.

The present invention concerns especially compounds of the Formula IIa

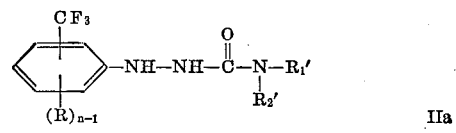 IIa where R represents hydrogen, chloro or trifluoromethyl, $n$ stands for 1 or 2, $R_1'$ and $R_2'$ each represents a hydrogen atom, an alkyl, especially a lower alkyl group, an alkenyl, especially a lower alkenyl group, a cycloalkyl, cycoalkenyl, cycloalkyl-lower alkyl or cycloalkenyl-lower alkyl group, each preferably with 5-7 ring members, a phenyl group, which may be substituted by lower alkyl, lower alkoxy, halogen and/or trifluoromethyl, or a phen- yl-lower alkyl group the phenyl nucleus of which may be substituted by lower alkyl, lower alkoxy, halogen and/or trifluoromethyl or, when taken together, a lower alkylene residue with 4–7 carbon atoms.

Particularly valuable are compounds of the Formula IIb

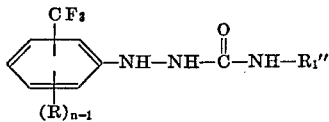

where R and n have the above meanings, $R_1''$ stands for hydrogen, a lower alkyl or lower alkenyl group, and above all the 1-(3,5-bis-trifluoromethylphenyl)-4-methyl-semicarbazide and 1 - (3,5 - bis-trifluoromethylphenyl)-semicarbazide which on oral administration in doses of about 0.004 g. to about 0.025 g. daily to rats and mice, display excellent anticonvulsant properties.

The new compounds are manufactured by known methods. Preferably, compounds of the formulae

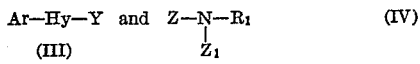

wherein either Y or Z represents a hydrogen atom, a free or a salified sulphonic acid group, and the other stands for a free carboxyl group or a functionally modified carboxyl containing the carbonyl portion, and $Z_1$ has the same meaning as $R_2$ or, when Y stands for a hydrogen atom or a free or salified sulphonic acid group, together with Z may also form a carbonyl group, or salts thereof are reacted together, or in a compound of the formula

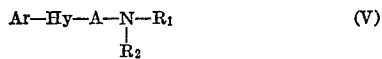

in which A represents a grouping, which may optionally have a double bond together with one of the two nitrogen atoms it connects or may form together with these two nitrogen atoms and with an additional grouping connecting the latter a five-membered ring, and which is capable of being converted into carbonyl group, the group A is converted into the carbonyl group, while simultaneously removing a C=N— double bond optionally present, and, if desired, in a resulting compound containing a nitrogen atom to which a hydrogen atom is attached, the latter is replaced by an organic residue.

In a starting material of the Formula III or IV one of the groups Y or Z is in the first place a functionally modified carboxyl group containing its carbonyl portion, such as an esterified carboxyl group, for example, a carbo-lower alkoxy- or carbo-lower alkylmercapto group, a halogenocarbonyl group, such as a chlorocarbonyl group, or the carbamyl group. A compound, in which Z or, preferably, Y represents a salified sulphonic acid group, is a salt, especially an alkali metal salt of a compound containing a sulphonic acid group as residue Y or Z. The reaction of a compound having one of the aforementioned free or functionally modified carboxyl groups with the compound containing an amino or a hydrazino group, or with the corresponding N-sulphonic acid derivative, is carried out by one of the known methods, for example, in the absence or preferably in the presence of a diluent, if necessary, with cooling or especially with heating, under atmospheric or superatmospheric pressure and/or under an inert gas.

Starting materials of the Formula IV, where Z and $Z_1$ together represent a carbonyl group, may be isocyanates. The reaction of such compounds with a hydrazine of the Formula III used as starting material is carried out in known manner.

A grouping A, capable of being converted into a carbonyl group is, for example, a thiocarbonyl or iminomethylene group, as well as an etherified mercapto methylidyne group which is connected through a double bond with one of the two nitrogen atoms; in the etherified mercapto group, the etherfying portion is, for example, an aliphatic, such as a lower alkyl, or an araliphatic residue. Together with the two nitrogen atoms it connects, and together with an oxalyl group also connecting these two nitrogen atoms, a carbonyl group representing the grouping A may form, for example, an N,N'-parabanic acid residue.

The group A is converted into the carbonyl group according to per se known methods, while removing a C=N— double bond optionally present, e.g. by hydrolysis, for example, by treatment with water. Hydrolysis takes place in a known manner, if necessary, in the presence of an oxidation reagent, such as hydrogen peroxide (in case the grouping A represents a thiocarbonyl group, preferably in the presence of an alkaline reagent, such as an alkali metal hydroxide) or nitrous acid, and/or of a sulfur-binding reagent, such as a lead or mercury oxide.

In a resulting compound containing a nitrogen atom, to which a hydrogen atom is attached, such hydrogen may be replaced in known manner by an organic residue, especially by an aliphatic or araliphatic residue, for example, by treatment with a reactive esterified aliphatic or araliphatic alcohol, such as an aliphatic or araliphatic halide or sulphate, preferably by first forming a salt, for example, an alkali metal salt of the resulting compound.

The starting materials used in the above process are known or can be prepared by known methods. Thus, the compounds of the Formulae III and IV, in which Y or Z is a free or functionally modified carboxyl group, are obtained by treatment of a compound of the Formula III or IV, where Y or Z is a hydrogen atom with a suitable derivative of carbonic acid, such as phosgene, with a lower alkyl ester of a halogenoformic acid, an alkali metal isocyanate or with another suitable reagent.

Starting materials, in which sulphonic acid groups Y or Z are attached through nitrogen, or their salts, are preferably formed as intermediate products in the manufacture of hydrazine or amine starting materials of the Formulae III and IV by reduction from corresponding nitro or nitroso compounds with a bisulphite salt.

Starting materials of the Formula V are obtained, for example, according to the above procedure by replacing the oxygen-containing starting materials by the corresponding sulfur-analogs.

Depending on the starting materials and reaction conditions used, the final products are obtained in the free form or in the form of their salts. The salts can be converted into the free bases by known methods, for example, by treatment with alkaline reagents or ion exchange resins, or into other salts, for example, by treatment with ion exchange resins or with salts, especially metal salts of organic acids. When the bases are reacted by known methods with organic acids, especially those capable of forming therapeutically acceptable, nontoxic salts, they yield acid addition salts. Suitable acids are, for example, hydrohalic acids, such as hydrochloric or hydrobromic acid, sulphuric or phosphoric acids, nitric and perchloric acid, as well as organic acids, such as aliphatic, alicyclic, aromatic, araliphatic or heterocyclic carboxylic or sulphonic acids, such as acetic, pivalic, glycollic, lactic, malic, tartaric, glucuronic, nitric, maleic, hydroxymaleic, benzoic, p-aminobenzoic, anthranilic, p-hydroxybenzoic, salicylic, 2-acetoxybenzoic, p-aminosalicylic, embonic, methanesulphonic, ethanesulphonic, hydroxyethanesulphonic, ethylenesulphonic, halobenzenesulphonic, toluenesulphonic, naphthalenesulphonic, sulphanilic or N-cyclohexyl-sulfamic acid, as well as ascorbic acid, methionine, tryptophan, lysine or arginine.

The above mentioned and other salts of the new compounds, for example, their picrates, picrolonates, flavianates or salts with chloroplatinic, phosphotungstic, phosphomolybdic or Reinecke acid, may also be used for purifying the resulting compounds, by preparing such a salt, isolating it and liberating the free compound from it or preparing the desired salt. In view of the close relationship between the new compounds in the free form and in the form of their salts what has been said above and below with reference to the free compounds or the salts relates equally to the corresponding salts and free compounds, respectively, wherever this is possible and expedient.

The invention includes also any modification, in which a compound obtained as intermediate at any stage of the process is used as starting material and any remaining step/steps is/are carried out, or in which the starting materials are formed under the reaction conditions or are used in the form of their derivatives, for example their salts. Thus, one of the two reactants may be formed from an intermediate in the presence of the other, for example, by reacting two compounds of the Formulae III and IV, where Y and Z are hydrogen atoms, with phosgene, whereupon the desired compound is obtained without having to isolate a resulting starting material of the Formula III or IV.

The invention further includes any new intermediates or starting materials of which those are preferably used which give rise to the preferred final products referred to above.

The compounds of the present invention are, for example, useful in the form of pharmaceutical preparations for enteral, for example oral, or parenteral administration, which contain the new compounds in conjunction or admixture with an organic or inorganic, solid or liquid pharmaceutical excipient. The preparations may be in solid form, for example, as capsules, tablets, dragées or suppositories, or in liquid form, for example, as solutions or suspensions. Suitable excipients are, for example, starches, such as corn, wheat or rice starch, sugars, for example, lactose, glucose or sucrose, stearic acid or salts thereof, for example, magnesium or calcium stearate, stearyl alcohol, talcum, gums, tragacanth, water, propyleneglycol or a polyalkyleneglycol. The amount and type of excipient may vary considerably and depends, inter alia, on the type of preparation and the method of its formulation. If necessary, the preparations may contain further auxiliary substances, such as preserving, stabilising, wetting or emulsifying agents, salts for regulating the osmotic pressure, or buffers. They may also contain other pharmacologically useful substances. The preparations are formulated by the conventional methods, for example, by forming a mixture, a granulate or a solution.

The following examples illustrate the invention; temperatures are given in degrees centigrade.

EXAMPLE 1

A solution of 2.4 g. of methylisocyanate in 15 ml. of ether is added portionwise to a solution of 9.6 g. of 3,5 - bis-trifluoromethyl-phenylhydrazine in 15 ml. of ether. The mixture is allowed to stand overnight at room temperature and is then evaporated. The residue is heated for 30 minutes at 60 to 70°, then triturated with petroleum ether and filtered to yield the 1-(3,5-bis-trifluoromethylphenyl)-4-methyl-semicarbazide of the formula

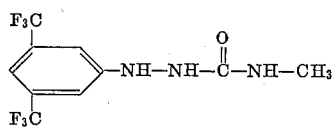

which melts at 216 to 218° on recrystallization from a mixture of ethyl acetate and hexane.

By selecting the appropriate starting materials in a similar manner the 1-(3,5-bis-trifluoromethylphenyl)-4-ethyl-semicarbazide, which melts at 184 to 186° on recrystallization from a mixture of ether and hexane, and the 1-(3,5-bistrifluoromethylphenyl) - 4 - n-butyl-semicarbazide, which melts at 131 to 132° on recrystallization from a mixture of acetone and hexane, in a similar manner.

EXAMPLE 2

A solution of 2.4 g. of 3,5-bis-trifluoromethyl-phenylhydrazine in 10 ml. of ethanol and 2 ml. of concentrated hydrochloric acid is treated with 12 g. of potassium cyanate in 5 ml. of water and refluxed for ½ hour. Addition of water precipitates the product, which is filtered, triturated with hexane and recyrstallized from acetone-hexane, to yield 1-(3,5-bis-trifluoromethyl-phenyl)-semicarbazide of the formula

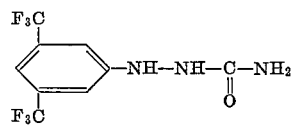

which melts at 205 to 208°.

EXAMPLE 3

A solution of 2.4 g. of 3,5-bis-trifluoromethyl-phenylhydrazine, 2 g. of triethylamine and 1.2 g. of N,N-dimethylcarbamylchloride in 10 ml. of toluene is refluxed for 30 hours. The solvent is then evaporated under vacuum and the residue taken up in methylenechloride, washed with dilute hydrochloric acid and then with water, and the solution is dried and evaporated. The residue is recrystallized twice from a mixture of ethyl acetate and hexane, to yield 1-(3,5-bis-trifluoromethylphenyl)-4,4-dimethyl-semicarbazide of the formula

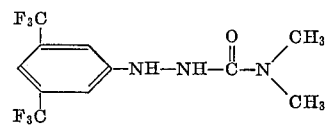

melting at 205 to 208°.

EXAMPLE 4

A solution of 3.6 g. of 3,5-bis-trifluoromethylphenylhydrazine and 1.9 g. of cyclohexylisocyanate in 25 ml. of benzene is heated under reflux for 2 hours. The solution is then concentrated to a small volume and treated with hexane to give the solid product. Recrystallization from a mixture of acetone and hexane affords 1-(3,5-bis-trifluoromethylphenyl)-4-cyclohexylsemicarbazide of the formula

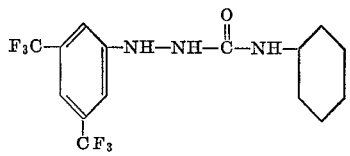

melting at 142 to 143°.

An identical reaction with the appropriate starting materials furnishes 1-(3-trifluoromethylphenyl)-4-methylsemicarbazide, melting at 129 to 131° on recrystallization from aqueous methanol.

EXAMPLE 5

A solution of 0.57 g. of methyl isocyanate in 10 ml. benzene is added to 2.1 g. of 2-chloro-5-trifluoromethylphenylhydrazine; an exothermic reaction occurs and a solid mass separates. The mixture is heated on the water bath for 2 hours. The solvent is then evaporated off and the residue triturated with hexane and filtered off. Recrystallization from acetone-hexane affords 1-(2-chloro-5-trifluoromethylphenyl)-4-methyl-semicarbazide of the formula

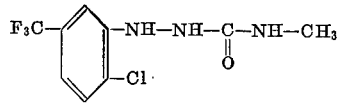

melting at 169 to 171°.

An identical reaction with the appropriate starting materials furnish the following compounds:

1-(4-chloro - 3 - trifluoromethyl-phenyl)-4-methyl-semicarbazide, melting at 198 to 199° upon recrystallization from a mixture of acetone and hexane; and 1-(4-chloro-2-trifluoromethyl-phenyl) - 4 - methyl-semicarbazide, melting at 155 to 157° C. upon recrystallization from a mixture of acetone and hexane.

EXAMPLE 6

20 grams of 1-(3,5-bis-trifluoromethyl-phenyl)-4-methylsemicarbazide are intimately mixed with 130 g. of corn starch. The mixture is combined with a paste from 30 g. of corn starch and 100 g. of distilled water and the whole is kneaded, granulated and dried at 45°. A mixture of 14 g. of talcum and 6 g. of magnesium stearate is thoroughly worked into the granulate which is then made into tablets each containing 0.05 g. or 0.25 g. of active ingredient.

EXAMPLE 7

20 grams of 1-(3,5-bis-trifluoromethyl-phenyl)-semicarbazide are intimately mixed with 130 g. of corn starch. The mixture is combined with a paste from 30 g. of corn starch and 100 g. of distilled water and the whole is kneaded, granulated and dried at 45°. A mixture of 14 g. of talcum and 6 g. of magnesium stearate is thoroughly worked into the granulate which is then made into tablets each containing 0.05 g. or 0.25 g. of active ingredient.

EXAMPLE 8

A mixture of 1.8 g. of 2-trifluoromethyl-phenyl-hydrazine and 0.63 g. of methylisocyanate in 15 ml. benzene is heated on the water-bath during 2 hours and is then triturated with hexane. The crystalline product is recrystallized from a mixture of acetone and hexane; the resulting 1-(2-trifluoromethylphenyl)-4-methyl-semicarbazide of the formula

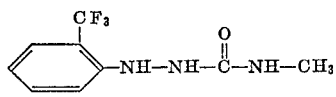

melting at 144–145°.

In a similar manner there is obtained by selecting the appropriate starting materials the 1-(4-trifluoromethyl-phenyl)-4-methyl-semicarbazide which melts at 161–163° after recrystallization from a mixture of acetone and hexane.

EXAMPLE 9

A solution of 3.6 g. of 3,5-bis-trifluoromethyl-phenyl-hydrazine and 1.6 g. of 2-chloroethyl-isocyanate in 25 ml. dry ether is stirred at room temperature for 2 hours and is then evaporated. The residue is triturated with hexane, filtered and recrystallized from a mixture of acetone and hexane; the 1-(3,5-bis-trifluoromethyl-phenyl)-4-(2-chloroethyl)-semicarbazide of the formula

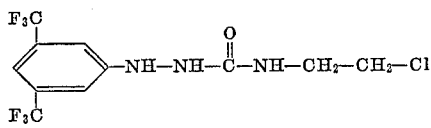

melts at 166–167°.

The 1 - (3,5-bis-trifluoromethyl-phenyl)-4-(3-chloropropyl)-semicarbazide can be obtained in a similar way by selecting the appropriate starting material; it melts at 106–108° after recrystallization from a mixture of chloroform and hexane.

EXAMPLE 10

A solution of 3 g. of 3,5-bis-trifluoromethyl-phenyl-hydrazine in 5 ml. of acetic acid, containing 1 g. of potassium cyanate, is heated on the steam bath during 30 minutes. After adding water, the product precipitates and is filtered off; after recrystallization from a mixture of acetone and hexane, the 1-(3,5-bis-trifluoromethyl-phenyl)-semicarbazide melts at 205–206°; it is identical with the product obtainable according to the procedure described in Example 2.

What is claimed is:

1. A semicarbazide of the formula

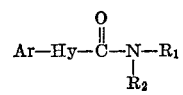

wherein Ar is selected from the group consisting of (1) phenyl groups substituted by trifluoromethyl and (2) phenyl groups substituted by trifluoromethyl and containing as further substituents members of the group consisting of trifluoromethyl and halo, Hy is hydrazo, each of the groups $R_1$ and $R_2$ stands for a member of the group consisting of hydrogen, lower alkyl, halo-lower alkyl and cyclo-lower alkyl having 5 to 7 ring members.

2. A compound as claimed in claim 1 having the formula

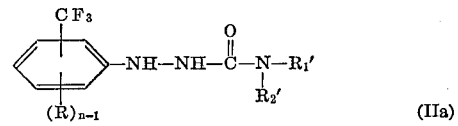

wherein R is selected from the group consisting of hydrogen, chloro and trifluoromethyl, $n$ is selected from the group consiting of 1 and 2, each of the groups $R_1'$ and $R_2'$ is selected from the group consisting of hydrogen, lower alkyl, halo-lower alkyl and cyclo-lower alkyl having 5 to 7 ring members.

3. A compound as claimed in claim 1 and being a member selected from the group consisting of a compound of the formula

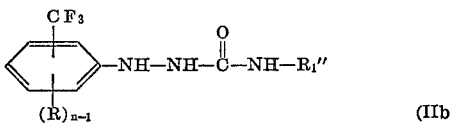

wherein R is a member selected from the group consisting of hydrogen, chloro and trifluoromethyl, $n$ stands for a member selected from the group consisting of 1 and 2, and $R_1''$ stands for a member selected from the group consisting of hydrogen and lower alkyl.

4. A compound as claimed in claim 1 and being 1-(3,5-bis-trifluoromethyl-phenyl)-4-methyl-semicarbazide.

5. A compound as claimed in claim 1 and being 1-(3,5-bis-trifluoro-methyl-phenyl)-semicarbazide.

6. A compound as claimed in claim 1 and being 1-(3,5-bis-trifluoro-methylphenyl)-4-ethyl-semicarbazide.

7. A compound as claimed in claim 1 and being 1-(3,5-bistrifluoromethylphenyl)-4-n-butyl-semicarbazide.

8. A compound as claimed in claim 1 and being 1-(3,5-bis-trifluoro-methyl-phenyl)-3,4-dimethyl-semicarbazide.

9. A compound as claimed in claim 1 and being 1-(3-trifluoromethyl-phenyl)-4-methyl-semicarbazide.

10. A compound as claimed in claim 1 and being 1-(4-trifluoromethyl-phenyl)-4-methyl-semicarbazide.

11. A compound as claimed in claim 1 and being 1-(2-trifluoromethyl-phenyl)-4-methyl-semicarbazide.

References Cited

UNITED STATES PATENTS

| 3,285,957 | 11/1966 | Baker et al. | 260—554 |
| 2,922,741 | 1/1960 | Urbschat et al. | 260—554 |

FOREIGN PATENTS

| 576,912 | 6/1959 | Canada | 260—554 |
| 12,440 | 2/1905 | Great Britain | 260—554 |

BERNARD HELFIN, Primary Examiner

M. W. GLYNN, Assistant Examiner

U.S. Cl. X.R.

424—323; 260—501.17, 501.18, 501.11, 247.2, 247.1, 294, 326.3, 295, 332.2; 424—316, 248, 267, 274, 275